(12) United States Patent
Lee et al.

(10) Patent No.: US 9,533,403 B2
(45) Date of Patent: Jan. 3, 2017

(54) JOINT GUARANTEE SYSTEM FOR VEHICLE ASSEMBLY AND CONTROL METHOD OF THE SAME

(71) Applicants: Hyundai Motor Company, Seoul (KR); Kia Motors Corporation, Seoul (KR)

(72) Inventors: Jaehyun Lee, Seoul (KR); Sung Phil Ryu, Seoul (KR)

(73) Assignee: Hyundai Motor Company, Seoul (KR)

( * ) Notice: Subject to any disclaimer, the term of this patent is extended or adjusted under 35 U.S.C. 154(b) by 287 days.

(21) Appl. No.: 14/089,195

(22) Filed: Nov. 25, 2013

(65) Prior Publication Data

US 2014/0298636 A1    Oct. 9, 2014

(30) Foreign Application Priority Data

Apr. 3, 2013    (KR) .................. 10-2013-0036503

(51) Int. Cl.
  *B23P 21/00*    (2006.01)
  *B25B 23/14*    (2006.01)
  (Continued)

(52) U.S. Cl.
  CPC .............. *B25B 23/14* (2013.01); *B23P 21/008* (2013.01); *B25B 21/00* (2013.01); *B23P 19/065* (2013.01); *B23P 21/004* (2013.01); *B23P 2700/50* (2013.01); *Y10T 29/4978* (2015.01); *Y10T 29/49766* (2015.01); *Y10T 29/49778* (2015.01); *Y10T 29/49829* (2015.01);
  (Continued)

(58) Field of Classification Search
  CPC .......... Y10T 29/4978; Y10T 29/49778; Y10T 29/49766; Y10T 29/53048; Y10T 29/49829; Y10T 29/53061; Y10T 29/53052; Y10T 29/53417; Y10T 29/534; Y10T 29/53383; Y10T 29/53365; B23P 19/065; B23P 2700/50; B23P 21/008; B23P 21/004
  See application file for complete search history.

(56) References Cited

U.S. PATENT DOCUMENTS

2003/0196312 A1*  10/2003  Moore ................... B23P 19/001
                                                          29/430
2011/0042462 A1*   2/2011  Smith .................... G08G 1/017
                                                          235/462.11

FOREIGN PATENT DOCUMENTS

JP          3212993 B2      7/2001
JP       2006-293762 A     10/2006
          (Continued)

*Primary Examiner* — Jermie Cozart
(74) *Attorney, Agent, or Firm* — Morgan, Lewis & Bockius LLP

(57) ABSTRACT

A system and method for vehicle assembly may include a vehicle body sensing unit sensing positions of vehicle bodies conveyed at regular intervals along a vehicle body convey line, a tool sensing unit disposed on a fastening tool for assembling parts to a vehicle body and sensing movement displacement of the fastening tool with respect to an origin of the fastening tool, a tool controller that transmits a fastening torque value of a predetermined part to the fastening tool in accordance with the movement displacement of the fastening tool and records an accumulated value of the movement displacement of the fastening tool, and a main controller that stores a result value of fastening the part, corresponding to a vehicle number of the vehicle body, on the basis of the accumulated value of the movement displacement of the fastening tool and positional information of the vehicle body.

14 Claims, 5 Drawing Sheets

(51) Int. Cl.
  *B25B 21/00* (2006.01)
  *B23P 19/06* (2006.01)
(52) U.S. Cl.
  CPC .... *Y10T 29/53039* (2015.01); *Y10T 29/53048* (2015.01); *Y10T 29/53061* (2015.01); *Y10T 29/53365* (2015.01)

(56) References Cited

FOREIGN PATENT DOCUMENTS

KR     2004102295 A  * 12/2004
KR     101149804 B1    5/2012

\* cited by examiner

JOINT GUARANTEE SYSTEM FOR VEHICLE ASSEMBLY AND CONTROL METHOD OF THE SAME

CROSS-REFERENCE TO RELATED APPLICATION

The present application claims priority of Korean Patent Application Number 10-2013-0036503 filed on Apr. 3, 2013, the entire contents of which application are incorporated herein for all purposes by this reference.

BACKGROUND OF INVENTION

Field of Invention

The present invention relates to a vehicle assembly system. More particularly, the present invention relates to a joint guarantee system for vehicle assembly that can manage joint history of parts of a vehicle in an assembly line where the parts are assembled to a vehicle body, and a control method of the same.

Description of Related Art

In general, vehicle makers assemble tens of thousands of parts through a large vehicle number of welding and assembly processes in all of mass production processes to produce vehicles. In particular, most of the works made in a designing process of the processes of producing a finished vehicle is a fastening process that fastens various parts to a vehicle by, using fasteners such as bolts and nuts.

The fastening process impacts the quality index of the vehicle such as durability or the degree of comfort of the finished vehicle, which the consumers feel, so it is required to thoroughly manage the joint history of the parts for the vehicle body. However, although the importance of managing the joint history of parts for a vehicle body is recognized in the art, management of joint history with a high practical effect has not been made by technical limitations.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a joint guarantee system for vehicle assembly having advantages of being able to manage joint history with a high practical effect by precisely recognizing the positions of a vehicle body and fastening tools in an assembly line of a vehicle, and a control method of the same.

Various aspects of the present invention provide a joint guarantee system for vehicle assembly, which may include i) a vehicle body sensing unit that is disposed outside a vehicle body convey line and senses positions of vehicle bodies conveyed at regular intervals along the vehicle body convey line, ii) a tool sensing unit that is disposed on a fastening tool for assembling parts to a vehicle body and senses movement displacement of the fastening tool with respect to an origin of the fastening tool, iii) a tool controller that transmits a fastening torque value of a predetermined part to the fastening tool in accordance with the movement displacement of the fastening tool sensed by the tool sensing unit and records an accumulated value of the movement displacement of the fastening tool, and iv) a main controller that stores a result value of fastening the part, corresponding to a vehicle number of the vehicle body, on the basis of the accumulated value of the movement displacement of the fastening tool acquired from the tool controller and positional information of the vehicle body acquired by the vehicle sensing unit.

In the joint guarantee system for vehicle assembly according to an aspect of the present invention, the vehicle body sensing unit may include a barcode reader that is disposed at an entrance of the vehicle body convey line and recognizes a barcode on the vehicle body, and a vision camera that is disposed at at least one of the entrance or an exit of the vehicle body convey line and takes a picture of the vehicle body.

In the joint guarantee system for vehicle assembly according to an aspect of the present invention, the tool sensing unit may include an acceleration sensor that senses in real time an acceleration value on three motional axes (x, y, and z axes) of the fastening tool and outputs the sensed acceleration value to the tool controller.

In the joint guarantee system for vehicle assembly according to an aspect of the present invention, the tool sensing unit may further include a gyroscope sensor that senses inclination of the fastening tool and outputs the sensed inclination to the tool controller.

In the joint guarantee system for vehicle assembly according to an aspect of the present invention, the tool sensing unit may further include a geomagnetic sensor that senses inclination of the fastening tool with respect to a gravitational direction of the earth and outputs the sensed inclination to the tool controller.

In the joint guarantee system for vehicle assembly according to an aspect of the present invention, the tool controller may calculate movement displacement of the fastening tool on three motional axes by integrating the acceleration value sensed by the acceleration sensor to time and then integrating again the integrated value.

In the joint guarantee system for vehicle assembly according to an aspect of the present invention, the tool controller may correct the acceleration value sensed by the acceleration sensor with the inclinations sensed by the gyroscope sensor and the geomagnetic sensor, and accumulates and records the corrected acceleration value.

Various other aspects of the present invention provide a control method of a joint guarantee system for vehicle assembly, which may (a) provide a joint guarantee system for vehicle assembly of the present invention including the vehicle body sensing unit, the tool sensing unit, and the tool controller, (b) sense the positions of the vehicle bodies conveyed at regular intervals along the vehicle body convey line by the vehicle body sensing unit, (c) sense the movement displacement of the fastening tool with respect to the origin of the fastening tool by the tool sensing unit, outputting sensed signal or signals to the tool controller, and recording an accumulated value of the movement displacement of the fastening tool on the tool controller, (d) transmit the fastening torque value of the predetermined part to the fastening tool by the tool controller, when it is determined that the movement displacement on three motional axes (x, y, and z axes) of the fastening tool is substantially "0", and (e) acquire the accumulated value of the movement displacement of the fastening tool from the tool controller, acquiring positional information of the vehicle body from the vehicle body sensing unit, and storing the result value of fastening a part, in correspondence to the vehicle number of the vehicle body, on the basis of the acquired accumulated value and positional information.

The control method of a joint guarantee system for vehicle assembly according to an aspect of the present invention may sense the acceleration on the three motional axes (x, y, and z axes) of the fastening tool and inclination of the fastening tool by the tool sensing unit.

The control method of a joint guarantee system for vehicle assembly according to an aspect of the present invention may recognize a barcode of the vehicle body moving into the vehicle convey line by the vehicle body sensing unit, and take a picture of the vehicle body by the vehicle body sensing unit at an entrance or an exit of the vehicle body convey line.

In the control method of a joint guarantee system for vehicle assembly according to an aspect of the present invention, the acceleration value of the fastening tool may be corrected on the basis of the measured inclination value of the fastening tool and the corrected acceleration value is accumulated and recorded by the tool controller.

The control method of a joint guarantee system for vehicle assembly according to an aspect of the present invention may store the result value of fastening the part in a server in correspondence to the vehicle number of the vehicle body, when a fastening completion signal of a part to a vehicle body is inputted through the tool controller.

The control method of a joint guarantee system for vehicle assembly according to an aspect of the present invention may calculate the fastening coordinates of the fastening tool and reset the origin of the fastening tool on the basis of the vehicle number of the vehicle body.

The control method of a joint guarantee system for vehicle assembly according to an aspect of the present invention may transmit the stored result value on a server to a subsequent repair process.

According to the present invention, it is possible to achieve joint history management with a high practical effect by precisely recognizing the positions of a vehicle body and a fastening tool, using a vehicle body sensing unit and a tool sensing unit. Further, accurate joint history management can be achieved, even if a worker works in an arbitrary order, not following the predetermined work order, or works out of a predetermined work position.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
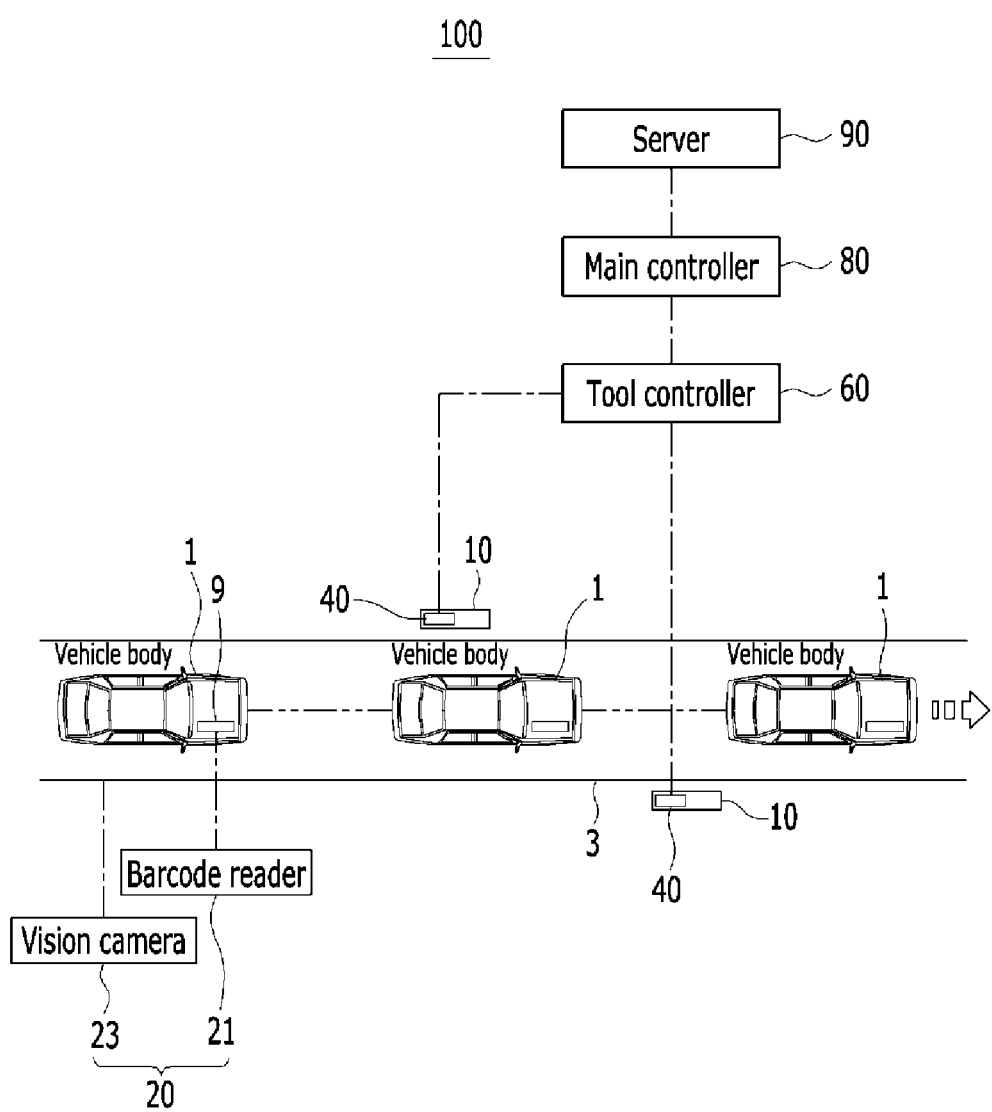
FIG. 1 is a plan schematic diagram of an exemplary joint guarantee system for vehicle assembly according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The unrelated parts to the description of the exemplary embodiments are not shown to make the description clear and like reference numerals designate like element throughout the specification. Further, the sizes and thicknesses of the configurations shown in the drawings are provided selectively for the convenience of description, so that the present invention is not limited to those shown in the drawings and the thicknesses are exaggerated to make some parts and regions clear. Discriminating the names of components with the first, the second, etc. in the following description is for discriminating them for the same relationship of the components and the components are not limited to the order in the following description.

Throughout the specification, unless explicitly described to the contrary, the word "comprise" and variations such as "comprises" or "comprising", will be understood to imply the inclusion of stated elements but not the exclusion of any other elements. Further, the terms, ". . . unit", ". . . mechanism", ". . . portion", ". . . member" etc. used herein mean the unit of inclusive components performing at least one or more functions or operations.

Figure 2:
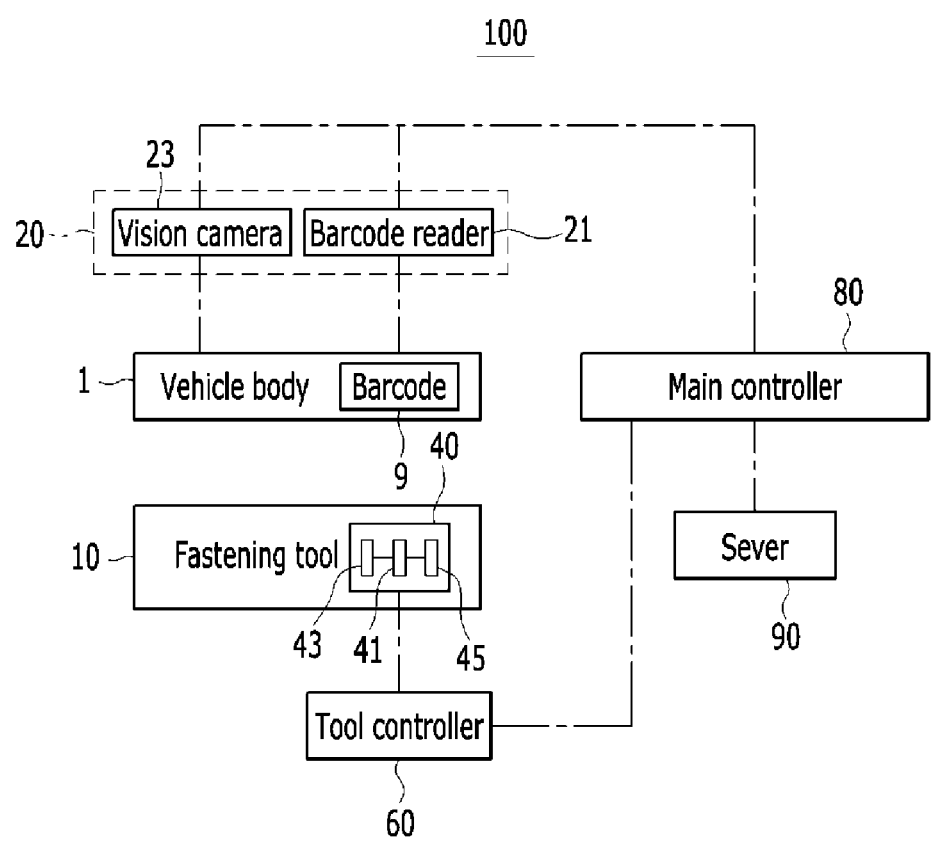
FIG. 2 is a schematic diagram of an exemplary joint guarantee system for vehicle assembly according to the present invention.

FIG. 1 is a plan schematic diagram of a joint guarantee system for vehicle assembly and FIG. 2 is a schematic diagram of the joint guarantee system for vehicle assembly according to various embodiments of the present invention. Referring to FIGS. 1 and 2, a joint guarantee system 100 for vehicle assembly is available for a vehicle assembly system in a vehicle production process for fastening/assembling predetermined parts to a vehicle body 1, which is a fastening object, with fastening members. For example, the joint guarantee system 100 is available for fastening and assembling design parts such as a brake pedal to the vehicle body 1 with fasteners including bolts and nuts in a design process in the processes of producing a finished vehicle.

The joint guarantee system 100 according to various embodiments of the present invention is provided for locating in real time all of the vehicle body 1 and the fastening tool 10 in a corresponding process (e.g. a design process) and for managing the joint history of the fastened parts to the vehicle body 1, using the locating result.

The vehicle bodies 1 are conveyed to a corresponding process at regular intervals on a vehicle body convey line 3, in which the vehicle body convey line 3 may include a conveyer line known in the art. The fastening tool 10, which is an electric fastening device that tightens fasteners such as bolts and nuts in an electric type, can assemble parts to the vehicle body 1 by fastening the fasteners with different fastening forces at a plurality of fastening positions.

Figure 3:
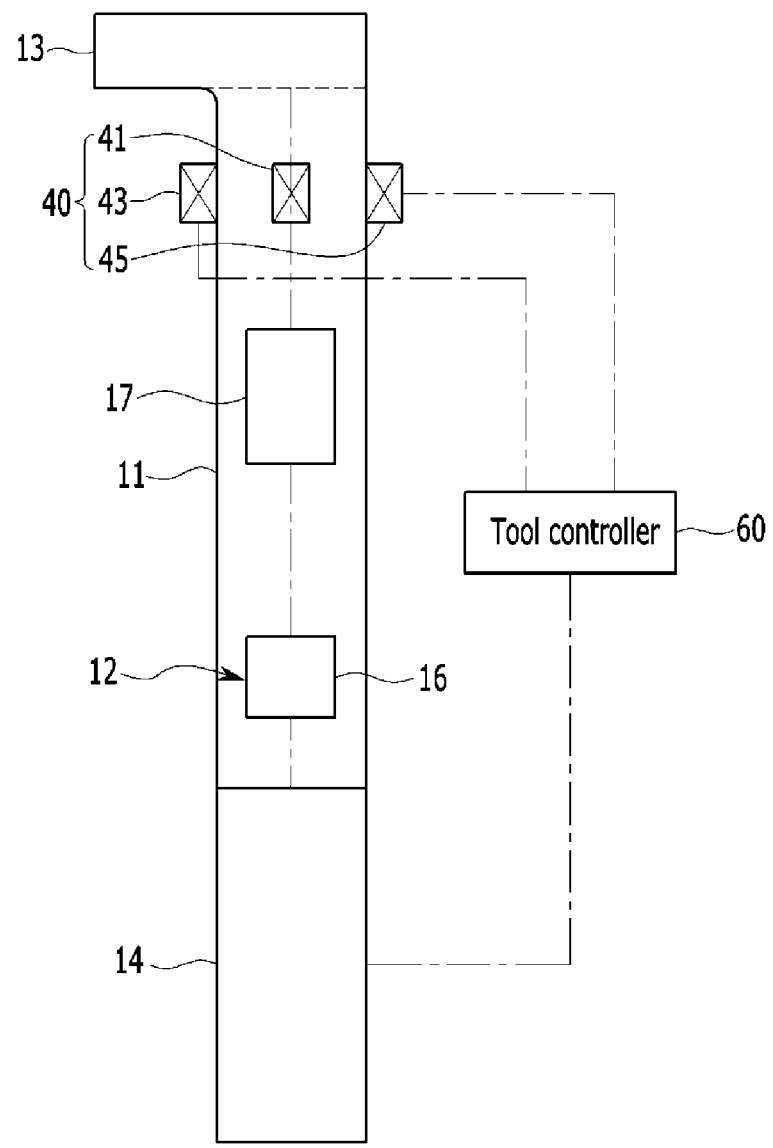
FIG. 3 is a block diagram schematically showing an exemplary fastening tool that is used for the joint guarantee system for vehicle assembly according to the present invention.
Figure 4:
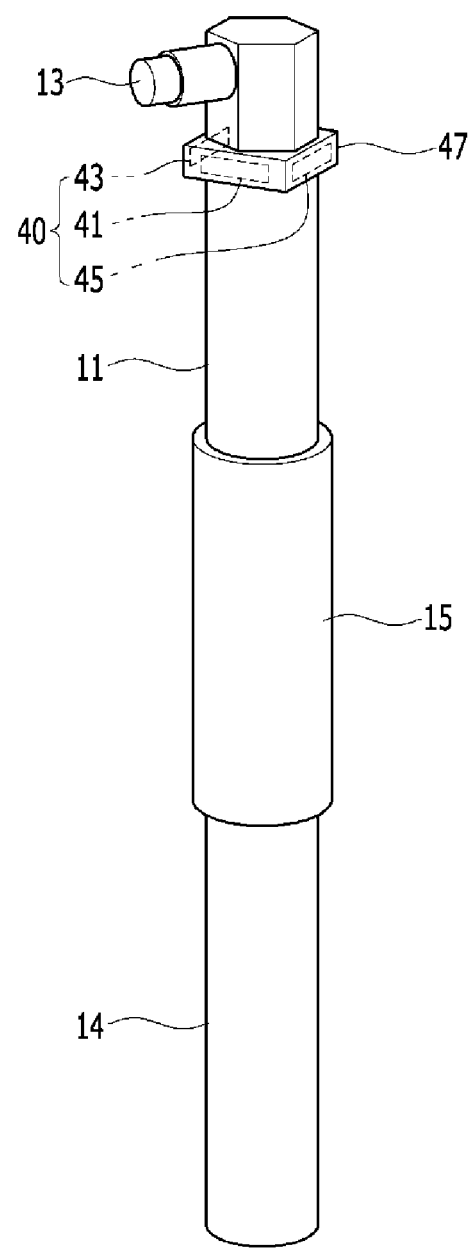
FIG. 4 is a perspective view showing an exemplary fastening tool that is used for the joint guarantee system for vehicle assembly according to the present invention.

The fastening tool 10, as shown in FIGS. 3 and 4, includes a tool body 11 and a driving unit 12. The tool body is the body of the electronic fastening device and predetermined constituent elements may be mounted on the tool body 11. The tool body 11 may have accessories such as various collars, brackets, and support blocks for supporting the constituent elements. In many cases, the accessories are provided for supporting various constituent elements and are considered as being included in the tool body 11, except for exceptional cases. The tool body 11 is substantially a cylindrical body and the driving unit 12 may be disposed therein.

A fastening portion 13 for fastening fasteners such as bolts and/or nuts to a predetermined fastening position is disposed at one end (upper end in the figure) of the tool body 11. The fastening portion 13 includes a socket supporting a fastening member and the socket may be rotatable by the driving unit 12. A power connection portion 14 for applying power to the driving unit is disposed at the other end (lower end in the figure) of the tool body 11. The power connection portion 14 may be connected to the other end of the tool body 11 in the type of a male and female connector. Further, a handle 15 for a worker to grip the tool is disposed at the substantially middle portion of the tool body 11. The handle 15 may be made of rubber or plastic.

The driving unit 12 is for providing fastening power (torque) to the fastening portion 13, and may be connected electrically with the power connection portion 14 and mechanically with the fastening portion 13 and may be disposed in the tool body 11. The driving unit 12 includes a motor 16 generating torque in response to an electric signal and a power transmission unit 17 transmitting the torque from the motor 16 to the fastening portion 13.

The power transmission unit 17, for example, may be a bevel driving gear and a bevel pinion gear connecting the motor 16 and the fastening portion 13 and may include other gear systems that transmit the torque from the motor 16 to a predetermined rotary body. The power transmission unit 17 is a power transmission unit known in the art, so the configuration is not described in detail herein.

The joint guarantee system 100 for vehicle assembly according to various embodiments of the present invention which can be used in a design process for fastening predetermined parts to the vehicle body 1, using the convey structure of the vehicle body 1 and the fastening tool 10 is configured to be able to manage joint history with a high practical use by precisely recognizing the positions of the vehicle body 1 and the fastening tool 10. To this end, the joint guarantee system 100 for vehicle assembly according to an exemplary embodiment of the present invention, as shown in FIGS. 1 and 2, includes a vehicle body sensing unit 20, a tool sensing unit 40, a tool controller 60, and a main controller 80.

The vehicle body sensing unit 20 is provided for sensing the positions of the vehicle bodies 1 conveyed at regular intervals along the vehicle body convey line 3. The vehicle body sensing unit 20 may be disposed outside the vehicle body convey line 3.

The vehicle body sensing unit 20 includes a barcode reader 21 and a vision camera 23. The barcode reader 21, which is provided for checking the vehicle number of vehicle body 1 by recognizing a barcode 9 on the vehicle body 1, may be disposed at the entrance of the vehicle body convey line 3.

The barcode reader 21 recognizes the barcode 9 of the vehicle body 1 and outputs the recognition signal to the main controller 80. The main controller 80 checks the vehicle number of the vehicle body 1 on the basis of the recognition signal obtained from the barcode reader 21 and generates order information to be used in the corresponding process. The barcode reader 21 is a barcode reader known in the art, so the configuration is not described in detail herein.

The vision camera 23 visually takes the picture of the vehicle body 1 that moves into the vehicle body convey line 3 or moves out of the vehicle body convey line 3 and may be disposed at at least one of the entrance and the exit of the vehicle body convey line 3, for example, at the entrance of the vehicle body convey line 3 by a specific bracket.

The vision camera 23 visually takes the picture of the vehicle body 1 at the entrance of the vehicle body convey line 3 and outputs the vision data to the main controller 80. Accordingly, the main controller 80 can analyze a specific point of the vision data (image) acquired through the vision camera 23 and can calculate the detailed position of the vehicle bodies 1 conveyed at regular intervals along the vehicle body convey line 3 in the corresponding process on the basis of the position of the specific point.

Further, since the gaps between the vehicle bodies 1 conveyed along the vehicle body convey line 3 are constant, the main controller 80 can calculate the exact position of the vehicle body 1 in another process through vehicle body position check in the entrance process or the exit process of the vehicle body convey line 3 by analyzing the specific point of the vision data acquire through the vision camera 23. The vision camera 23 is a vision system known in the art, so the configuration is not described in detail herein.

The tool sensing unit 40, which is for sensing the movement displacement of the fastening tool 10 from the origin (reference point) of the fastening tool 10, may be disposed on the fastening tool 10. The tool sensing unit 40, as shown in FIGS. 3 and 4, includes an acceleration sensor 41, a gyroscope sensor 43, and a geomagnetic sensor 45. The acceleration sensor 41, the gyroscope sensor 43, and the geomagnetic sensor 45 may be disposed at the fastening portion 13 of the tool body 11 by a mounting bracket 47.

The acceleration sensor 41 senses in real time the acceleration value on three motional axes (x, y, and z axes) of the fastening tool 10, when a worker moves with the fastening tool 10, and outputs the detection signal to the tool controller 60 (hereafter, see FIGS. 1 and 2) which is described in detail below.

Because the acceleration value measured by the acceleration sensor 41 is influenced by the gravitational acceleration, when the worker 10 holds the fastening tool 10 at an angle, the gyroscope sensor 43 (also called a "gyrosensor" by those skilled in the art) is provided for correcting the influenced by the gravitational acceleration. The gyroscope sensor 43 measures the inclination of the fastening tool 10, that is, the rotational angular speed and outputs the measured value to the tool controller 60 that is described in detail below.

The geomagnetic sensor 45, which is a sensor that senses how much angle the fastening tool 10 inclines at with respect to the earth gravitational direction, is provided, similar to the gyroscope sensor 43, for correcting the influence by the gravitational acceleration because the acceleration value measured by the acceleration sensor 41 is influenced by the gravitational acceleration when the worker holds the fastening tool 10 at an angle. The geomagnetic sensor 45 measures the inclination of the fastening tool 10 and outputs the measured value to the tool controller 60 that is described in detail below.

The acceleration sensor 41, the gyroscope sensor 43, and the geomagnetic sensor 45 are known in the art, so the detailed description is not provided in detail herein.

The tool controller 60, as shown in FIGS. 1 and 2, can calculate movement displacement on the three motional axes of the fastening tool 10 by integrating the acceleration value of the fastening tool 10 sensed by the acceleration sensor 41 of the tool sensing unit 40 described above to time and by integrating again the integrated value.

The tool controller 60 records accumulated values of the movement displacement of the fastening tool 10 by correcting the acceleration value sensed by the acceleration sensor 41 with the measured inclination values of the fastening tool 10 sensed by the gyroscope sensor 43 and the geomagnetic sensor 45, and then accumulating the corrected acceleration value. That is, the tool controller 60 corrects the acceleration value of the fastening tool 10 measured by the acceleration sensor 41 by calculating the influence by the gravitational acceleration to the fastening tool 10 on the basis of the inclination values of the fastening tool 10 measured by the gyroscope sensor 43 and the geomagnetic sensor 45.

Further, the tool controller 60 transmits a fastening torque value of a predetermined part to the fastening tool 10 in accordance with the movement displacement of the fastening tool 10 sensed by the tool sensing unit 40.

The main controller 80, which controls the entire operation of the system 100, makes the tool controller 60 transmit the fastening torque value of the predetermined part to the fastening tool 10, when it determines that the movement displacement value is "0", after receiving the movement displacement value on the three motional axes of the fastening tool 10 from the tool controller 60.

Further, the main controller 80 stores the result value of fastening the part to a server 90, corresponding to the vehicle number of the vehicle body 1, on the basis of the accumulated movement displacement values of the fastening tool 10 acquired from the tool controller 60 and the positional information of the vehicle body 1 acquired through the barcode reader 21 and the vision camera 23 of the vehicle body sensing unit 20.

Dilating on it, the main controller 80 checks the vehicle number of the vehicle body 1 on the basis of the barcode recognition signal of the vehicle body 1 acquired from the barcode reader 21 and generates order information to be used in the corresponding process. That is, the main controller 80 sequentially generates order information while moving the previously checked vehicle number forward by one process every time the vehicle number of the vehicle body 1 is checked by the barcode reader 21. By repeating this process, the main controller 80 can check what vehicle number the vehicle 1 has is in each process between the entrance process and the exit process of the vehicle body 1.

Further, the main controller 80 can analyze a specific point of the vision data acquired through the vision camera 23 and can calculate the detailed position of the vehicle bodies 1 conveyed at regular intervals along the vehicle body convey line 3 in the corresponding process on the basis of the position of the specific point.

Further, since the gaps between the vehicle bodies 1 conveyed along the vehicle body convey line 3 are constant or substantially constant, the main controller 80 can calculate the exact position of the vehicle body 1 in another process through vehicle body position checked in the entrance process or the exit process of the vehicle body convey line 3 by analyzing the specific point of the vision data acquire through the vision camera 23.

The main controller 80 can store the result value of fastening of a part to the sever 90, corresponding to the vehicle number of the vehicle body 1, when a fastening completion signal of the part for the vehicle body 1 is inputted through the tool controller 60. Further, the main controller 80 can calculate the fastening coordinates of the fastening tool 10, using the vehicle number of the vehicle body 1, and can transmit the result stored in the server to the following repair process while resetting the origin of the fastening tool 10.

A control method of the joint guarantee system for vehicle assembly according to various embodiments of the present invention which has the configuration described above or similar configurations is described hereafter in detail with the drawings stated above and the drawings to be stated below.

Figure 5:
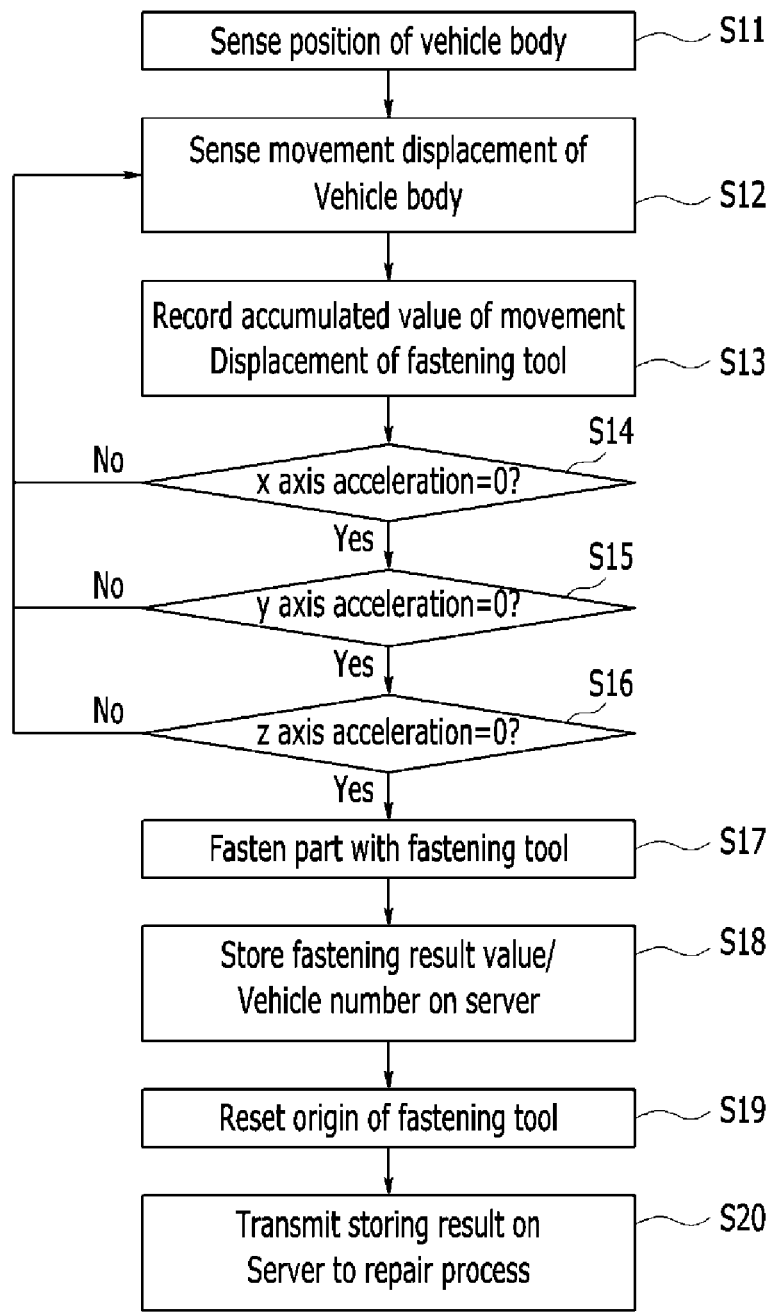
FIG. 5 is a flowchart illustrating an exemplary control method of the joint guarantee system for vehicle assembly according to the present invention.

FIG. 5 is a flowchart illustrating a control method of the joint guarantee system for vehicle assembly according to various embodiments of the present invention. Referring to FIG. 5, a joint guarantee system 100 including the vehicle body sensing unit 20, the tool sensing unit 40, and the tool controller 60 is provided.

First, in various embodiments of the present invention, the positions of the vehicle bodies 1 conveyed at regular intervals along the vehicle body convey line 3 are sensed by the barcode reader 21 and the vision camera 23 of the vehicle body sensing unit 20 (step S11).

The barcode reader 21 recognizes the barcode 9 on the vehicle body 1 and outputs the recognition signal to the main controller 80. The main controller 80 checks the number of the vehicle body 1 on the basis of the recognition signal obtained from the barcode reader 21 and generates order information to be used in the corresponding process. In this case, the main controller 80 can sequentially generate order information while moving the previously checked vehicle number forward by one process every time the vehicle number of the vehicle body 1 is checked by the barcode reader 21.

The vision camera 23 visually takes the picture of the vehicle body 1 at the entrance of the vehicle body convey line 3 and outputs the vision data to the main controller 80. Accordingly, the main controller 80 analyzes a specific point of the vision data (image) acquired through the vision camera 23 and calculates the detailed position of the vehicle bodies 1 conveyed at regular intervals along the vehicle body convey line 3 in the corresponding process on the basis of the position of the specific point.

In this case, since the gaps between the vehicle bodies 1 conveyed along the vehicle body convey line 3 are constant, the main controller 80 can calculate the exact position of the vehicle body 1 in another process through vehicle body position check in the entrance process or the exit process of the vehicle body convey line 3 by analyzing the specific point of the vision data acquire through the vision camera 23. By repeating this process, the main controller 80 can check what number the vehicle 1 has is in each process between the entrance process and the exit process of the vehicle body 1.

During the processes, in various embodiments of the present invention, the movement displacement of the fastening tool 10 is sensed with respect to the origin of the fastening tool 10 by the tool sensing unit 40 and the detection signal is outputted to the tool controller 60 (step S12).

The acceleration sensor 41 of the tool sensing unit 40 senses in real time the acceleration value on three movement axes (x, y, and z axes) of the fastening tool 10, when a worker moves with the fastening tool 10, and outputs the detection signal to the tool controller 60.

Further, when the worker holds the fastening tool 10 at an angle, the gyroscope sensor 43 and the geomagnetic sensor 45 of the tool sensing unit 40 sense the inclination of the fastening tool 10 and output the measured value of the inclination to the tool controller 60.

Then, the tool controller 60 records accumulated values of the movement displacement of the fastening tool 10 by correcting the acceleration value sensed by the acceleration sensor 41 with the measured inclination values of the fastening tool 10 sensed by the gyroscope sensor 43 and the geomagnetic sensor 45, and then accumulating the corrected acceleration value (step S13). That is, the tool controller 60 can correct the acceleration value of the fastening tool 10 measured by the acceleration sensor 41 by calculating the influence by the gravitational acceleration to the fastening tool 10 on the basis of the inclination values of the fastening tool 10 measured by the gyroscope sensor 43 and the geomagnetic sensor 45.

Thereafter, the main controller 80 determines whether the movement displacement on the three motional axes (x, y, and z axes) of the fastening tool 10 measured by the tool sensing unit 40 is "0" or substantially "0" (steps S14, S15, and S16). When it is determined that the movement displacement on the three motional axes (x, y, and z axes) of the fastening tool 10 is "0", the main controller 80 makes the tool controller 60 transmit the fastening torque value for a predetermined part to the fastening tool 10.

Then, the fastening tool 10 receives the fastening torque value corresponding to the predetermined fastening position of the part to the vehicle body 1 from the tool controller 60 and fastens the part 3 to the vehicle body 1 with fasteners such as bolts and nuts (step 517).

Thereafter, when a fastening completion signal of the part to the vehicle body 1 is inputted through the tool controller 60, the main controller 80 stores the result value of fastening the part to the server 90, corresponding to the vehicle number of the vehicle body on the basis of the accumulated value of movement displacement of the fastening tool 10 acquired from the tool controller 60 and the positional information of the vehicle body 1 which has been analyzed (step S18).

Next, the main controller 80 calculates the fastening coordinates of the fastening tool 10, using the vehicle number of the vehicle body 1, resets the origin of the fastening tool 10 (step S19), and then transmits the storing result on the server 90 to the following repair process (step S20).

As described above, the joint guarantee system 100 for vehicle assembly according to various embodiments of the present invention can achieve joint history management with a high practical effect by precisely recognizing the positions of the vehicle body 1 and the fastening tool 10 by means of the vehicle body sensing unit 20 and the tool sensing unit 40. Further, accurate joint history management can be achieved, even if a worker works in an arbitrary order, not following the predetermined work order, or works out of a predetermined work position.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For convenience in explanation and accurate definition in the appended claims, the terms "upper" or "lower", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A joint guarantee system for vehicle assembly, comprising;
    a vehicle body sensing unit disposed outside a vehicle body convey line and sensing positions of vehicle bodies conveyed at regular intervals along the vehicle body convey line;
    a tool sensing unit disposed on a fastening tool for assembling parts to a vehicle body and sensing movement displacement of the fastening tool with respect to an origin of the fastening tool;
    a tool controller that transmits a fastening torque value of a predetermined part to the fastening tool in accordance with the movement displacement of the fastening tool sensed by the tool sensing unit and records an accumulated value of the movement displacement of the fastening tool; and
    a main controller that stores a result value of fastening the part, corresponding to a vehicle number of the vehicle body, on the basis of the accumulated value of the movement displacement of the fastening tool acquired from the tool controller and positional information of the vehicle body acquired by the vehicle sensing unit.

2. The system of claim 1, wherein the vehicle body sensing unit includes:
    a barcode reader disposed at an entrance of the vehicle body convey line and recognizing a barcode on the vehicle body, and
    a vision camera disposed at at least one of the entrance or an exit of the vehicle body convey line and taking a picture of the vehicle body.

3. The system of claim 1, wherein the tool sensing unit includes an acceleration sensor that senses in real time an acceleration value on three motional axes (x, y, and z axes) of the fastening tool and outputs the sensed acceleration value to the tool controller.

4. The system of claim 3, wherein the tool sensing unit further includes a gyroscope sensor that senses inclination of the fastening tool and outputs the sensed inclination to the tool controller.

5. The system of claim 4, wherein the tool sensing unit further includes a geomagnetic sensor that senses inclination of the fastening tool with respect to a gravitational direction of the earth and outputs the sensed inclination to the tool controller.

6. The system of claim 5, wherein the tool controller corrects the acceleration value sensed by the acceleration sensor with the inclinations sensed by the gyroscope sensor and the geomagnetic sensor, and accumulates and records the corrected acceleration value.

7. The system of claim 3, wherein the tool controller determines movement displacement of the fastening tool on three motional axes by integrating the acceleration value sensed by the acceleration sensor to time and then integrating again the integrated value.

8. A control method of a joint guarantee system for vehicle assembly, the method comprising:
providing a joint guarantee system for vehicle assembly, wherein the joint guarantee system comprises;
a vehicle body sensing unit disposed outside a vehicle body convey line and sensing positions of vehicle bodies conveyed at regular intervals along the vehicle body convey line:
a tool sensing unit disposed on a fastening tool for assembling parts to a vehicle body and sensing movement displacement of the fastening tool with respect to an origin of the fastening tool;
a tool controller that transmits a fastening torque value of a predetermined part to the fastening tool in accordance with the movement displacement of the fastening tool sensed by the tool sensing unit and records an accumulated value of the movement displacement of the fastening tool; and
a main controller that stores a result value of fastening the part, corresponding to a vehicle number of the vehicle body, on the basis of the accumulated value of the movement displacement of the fastening tool acquired from the tool controller and positional information of the vehicle body acquired by the vehicle sensing unit;
sensing the positions of the vehicle bodies conveyed at regular intervals along the vehicle body convey line by the vehicle body sensing unit;
sensing the movement displacement of the fastening tool with respect to the origin of the fastening tool by the tool sensing unit, outputting sensed signal or signals to the tool controller, and recording an accumulated value of the movement displacement of the fastening tool on the tool controller;
transmitting the fastening torque value of the predetermined part to the fastening tool by the tool controller, when it is determined that the movement displacement on three motional axes (x, y, and z axes) of the fastening tool is substantially "0"; and
acquiring the accumulated value of the movement displacement of the fastening tool from the tool controller, acquiring positional information of the vehicle body from the vehicle body sensing unit, and storing the result value of fastening a part, in correspondence to the vehicle number of the vehicle body, on the basis of the acquired accumulated value and positional information.

9. The method of claim 8, further comprising:
sensing acceleration on the three motional axes (x, y, and z axes) of the fastening tool and inclination of the fastening tool by the tool sensing unit.

10. The method of claim 9, wherein the acceleration value of the fastening tool is corrected on the basis of the measured inclination value of the fastening tool and the corrected acceleration value is accumulated and recorded by the tool controller.

11. The method of claim 10, wherein when a fastening completion signal of a part to a vehicle body is input through the tool controller, the result value of fastening the part is stored in a server in correspondence to the vehicle number of the vehicle body.

12. The method of claim 8, further comprising:
recognizing a barcode of the vehicle body moving into the vehicle convey line by the vehicle body sensing unit; and
taking a picture of the vehicle body by the vehicle body sensing unit at an entrance or an exit of the vehicle body convey line.

13. The method of claim 11, wherein fastening coordinates of the fastening tool are determined and the origin of the fastening tool is reset on the basis of the vehicle number of the vehicle body.

14. The method of claim 8, wherein the stored result value on a server is transmitted to a subsequent repair process.

* * * * *